United States Patent [19]
Bailey et al.

[11] Patent Number: 6,001,249
[45] Date of Patent: Dec. 14, 1999

[54] MULTI-STAGE WATER FILTER SYSTEM

[75] Inventors: J. Rushton Bailey, Lake Mary; William Reinhard, Deltona; Stephen E. Frazier, Lake Mary, all of Fla.

[73] Assignee: Dart Industries Inc., Orlando, Fla.

[21] Appl. No.: 08/965,265

[22] Filed: Nov. 6, 1997

[51] Int. Cl.$^6$ ............ B01D 15/00; B01D 27/08; C02F 1/28; C02F 9/00

[52] U.S. Cl. ............ 210/232; 210/85; 210/87; 210/88; 210/89; 210/266; 210/282; 210/288; 210/256; 210/259; 210/335; 210/339; 210/501; 210/502.1; 210/510.1

[58] Field of Search ............ 210/266, 282, 210/232, 288, 238, 259, 256, 510.1, 501, 502.1, 323.2, 335, 339, 85, 87, 88, 89

[56] References Cited

U.S. PATENT DOCUMENTS

| | | |
|---|---|---|
| 4,107,046 | 8/1978 | Corder . |
| 4,623,451 | 11/1986 | Oliver . |
| 4,681,677 | 7/1987 | Kuh . |
| 4,683,054 | 7/1987 | Turnbull . |
| 4,717,476 | 1/1988 | Scott . |
| 4,769,143 | 9/1988 | Deutsch . |
| 4,877,521 | 10/1989 | Petrucci . |
| 4,885,081 | 12/1989 | Oliver . |
| 4,909,931 | 3/1990 | Bibi . |
| 4,948,505 | 8/1990 | Petrucci . |
| 5,045,189 | 9/1991 | Van der Vos . |
| 5,045,192 | 9/1991 | Terhune . |
| 5,069,786 | 12/1991 | Pulek . |
| 5,078,864 | 1/1992 | Whittier . |
| 5,089,144 | 2/1992 | Ozkahyaoglu . |
| 5,130,020 | 7/1992 | Meckstroth . |
| 5,188,727 | 2/1993 | Kurth . |
| 5,236,578 | 8/1993 | Oleskow . |
| 5,256,285 | 10/1993 | Tomita . |
| 5,269,919 | 12/1993 | Von Medlin . |
| 5,344,558 | 9/1994 | Kool . |
| 5,351,035 | 9/1994 | Chrisco . |
| 5,395,509 | 3/1995 | Guerra-Cishenos . |
| 5,458,766 | 10/1995 | Ehara . |
| 5,510,026 | 4/1996 | Geibel . |
| 5,560,393 | 10/1996 | Clack . |
| 5,567,308 | 10/1996 | Visser . |
| 5,614,090 | 3/1997 | Breusch . |
| 5,653,878 | 8/1997 | Reid . |
| 5,685,981 | 11/1997 | Koslow . |
| 5,700,371 | 12/1997 | Koslow . |

FOREIGN PATENT DOCUMENTS

9706879  2/1997  WIPO .

*Primary Examiner*—Thomas M. Lithgow
*Attorney, Agent, or Firm*—Taylor J. Ross

[57] ABSTRACT

A water filter system having a housing for a plurality of serial-flow connected filter cartridges with distinct filtering characteristic related to the direction of flow of water being filtered. Each filter cartridge has a membrane wrapped activated carbon filter body. One of the filter bodies includes a heavy metal bacteriostat. The cartridges are each releasably retained in a manifold by keyed connectors including rotatable locking rings. Each cartridge having a distinct filtering characteristic includes a keying structure to ensure that the cartridge can only be connected to the manifold for placement in proper serial-flow relationship in the system. The filter system includes a spent filter cartridge indicator. The filter system is particularly suited for countertop placement and connection to a faucet.

13 Claims, 9 Drawing Sheets

FIG. 2

FIG_3

FIG_9

FIG_12

MULTI-STAGE WATER FILTER SYSTEM

BACKGROUND OF THE INVENTION

As the quality of water from public water systems, particularly water from small public water systems, and private wells has become subject to contamination, the acceptability of tap water available to many has come to be questioned. Furthermore, whether the source of the water is from a well fed from an aquifer instead of from a river or reservoir the tap water may be characterized by problems associated with leaching of lead from plumbing, organic chemicals coming from industrial or agricultural runoff as well as some organic pollutants which ironically are by-products of water chlorination systems.

In addition, since public water systems are subject to breakdowns at treatment plants, microorganisms, and particularly pathogens may still be present in the tap water particularly when the source of water is surface water which has been contaminated by parasites such as cryptosporidium. It is generally recognized that few systems, be they public or private, perform the expensive filtering needed to remove such parasites. It is not uncommon for unsafe microorganisms levels to prompt a "boil order" so as to ensure that water is potable, particularly for those persons having compromised immunity.

FIELD OF THE INVENTION

The present invention relates generally to a water filter system and more particularly is directed to a water filter system having a plurality of filter cartridges in series, and/or in parallel, each cartridge preferably having distinct filtering characteristics and connected in predetermined flow relationship to a manifold by simplified error proof connect means. The system is preferably provided with spent filter indicator means.

OBJECTS AND SUMMARY OF THE INVENTION

It is therefore a primary object of the present invention to provide a water filter system having a plurality of filters preferably having distinct filtering characteristics which filters are placed in series, and/or in parallel in particular flow relationship, to reduce and/or eliminate metal contaminants, nitrate and nitrate ions, radioactive trace organic chemicals normally referred to as volatile organic compounds (VOC's), bad odors, taste and color, as well as bacteria, such as *E coli* and cysts such as Giardia and Cryptosporidium.

Another object of the invention is to provide a filter system particularly suited for final filtration of "tap" water, the quality of which is less than fully satisfactory.

A further object of the invention is to provide a filter system particularly suited for countertop placement and attachment to an outlet of a faucet wherein periodic replacement of the filter cartridges is simplified while ensuring that the filter cartridges may only be placed in proper serial-flow, and/or parallel flow, relationship in the multi-stage water filter system.

It is yet another object of the present invention to provide filter cartridges having distinct filtering characteristics whereby when utilized in serial-flow relationship provide multi-stage filtration of water, which filter cartridges include microporous carbon, or ceramic, bodies encased with at least one membrane so as to provide capture of particles, and/or microorganisms, as small as about 0.4 µm.

In general, the present invention contemplates a water filter system having a base provided with a manifold for fail safe simplified keyed error proof installation of, and replacement of, a plurality of filter cartridges having distinct filtering characteristics in their proper serial-flow relationship.

Securement of the filters in this manner is accomplished by a keyed, connector means configured so as to only permit connection of a given filter cartridge in its proper flow position in its related flow manifold.

The water filter system includes a decorative housing for the filter cartridges and in an alternate embodiment such housing is provided with a hand-held spray head connected to the filtered water outlet of the system by a flexible extensible conduit.

The water filter system is preferably provided with means for providing an indication as to when the filter cartridges require replacement so as to ensure maximum efficiency of filtration in accordance with National Sanitation Foundation (NSF) performance standards.

DETAILED DESCRIPTION OF THE PREFERRED EMBODIMENTS

Figure 1:
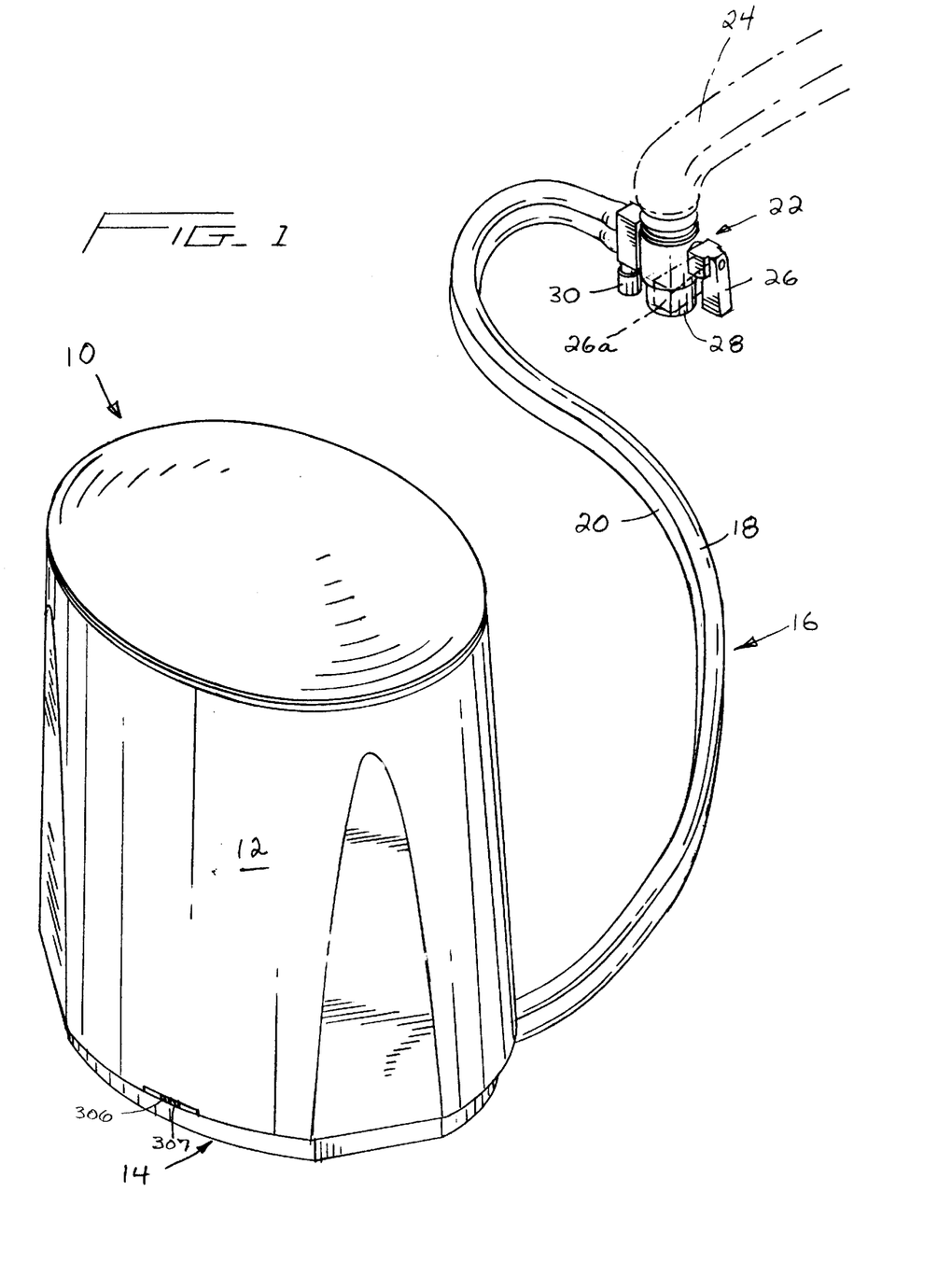
FIG. 1 is a front perspective view of the water filter system of the present invention showing a preferred dual-lumen flexible inlet-outlet conduit connected to the outlet of a faucet by means of a diverter valve.
Figure 2:
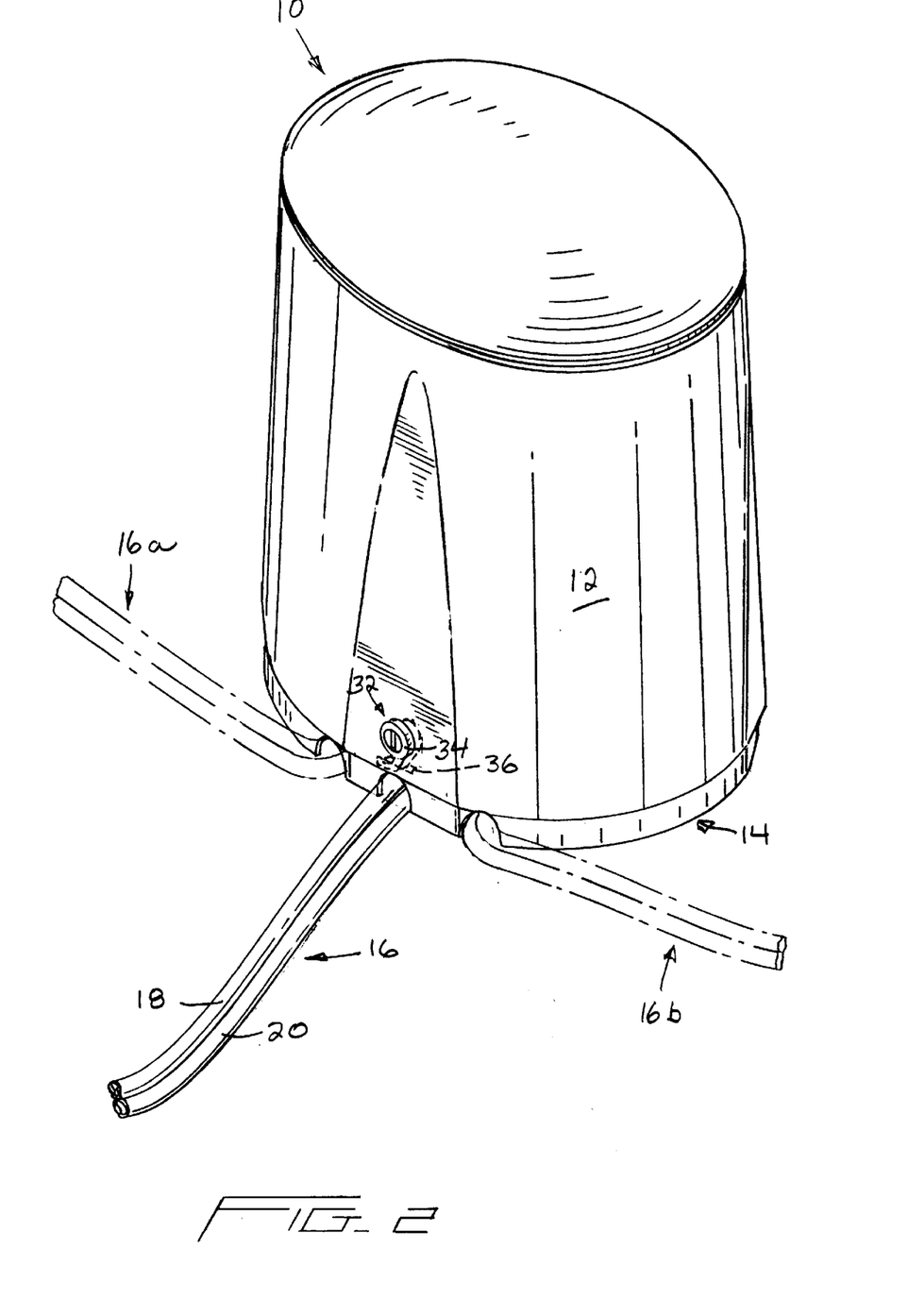
FIG. 2 is a rear perspective view of the water filter system of the present invention with the dual-lumen flexible conduit shown only partially, and illustrated in phantom lines to show alternate positioning of the conduit relative to the filter system housing.

Turning now to the drawings, there is shown in FIGS. 1 and 2 a multi-stage water filter system embodying the present invention generally indicated by reference numeral 10, which includes decorative housing portion 12 and a base indicted generally at 14. As will be seen best in FIG. 1 the water filter system 10 includes a flexible conduit indicated generally at 16 of dual-lumen construction having an inlet conduit 18 for supplying water to be filtered and an outlet conduit 20 for the discharge of filtered water. The dual-lumen conduit 16 is illustrated as being operatively connected to a diverter valve indicated generally at 22 shown affixed to faucet 24. The diverter valve per se is of conventional construction wherein positioning of valve actuating handle 26, as shown in full line, results in discharge of untreated tap water from faucet 24 to outlet 28, whereas rotation of valve actuating handle 26 to phantom line position 26a diverts tap water from faucet 24 to inlet conduit 18 for filtration. In a manner to be specifically described hereinafter filtered water is directed through the conduit 20 of the dual-lumen flexible conduit 16 for discharge from the diverter valve means 22 through filtered water outlet 30.

With particular reference to FIG. 2 it will be seen that the decorative housing portion 12 is releasably secured to the base 14 by a latch means indicated generally at 32 which includes a latching finger, or hook 34, which may selectively, by limited rotation, be engaged in a latching slot 36 provided in the base 14. It will be appreciated that decorative housing portion 12 is provided its lower front interior switch portion with a tab, or tabs, which project inwardly so as to be adapted to be received in complementary slots, or apertures 37 provided in the base portion 14, as best seen in FIG. 3.

As further seen in FIG. 2 the dual-lumen flexible conduit 16 may selectively, and alternatively, as shown in phantom lines at 16a and 16b be positioned to be extended to either side of the base portion 14 so as to enable the water filter system 10 to actually be placed against a wall or counter back-splash.

Figure 3:
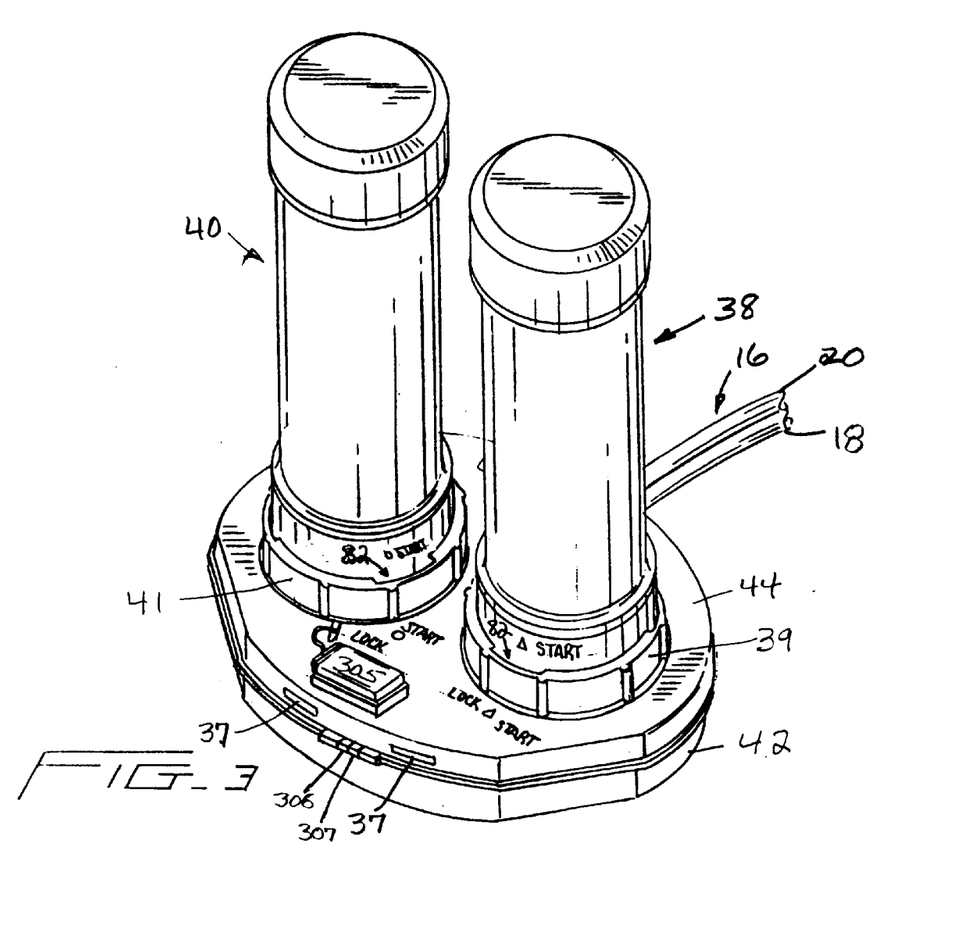
FIG. 3 is a front perspective view, in reduced scale, of the water filter system with the housing of FIGS. 1 and 2 removed and showing an initial position of elements of a keyed connector means.

Turning now to FIG. 3 it will be seen that decorative housing portion 12 has been unlatched and separated from base portion 14 to thus expose a plurality of filter cartridges as indicated generally at 38 and 40. As will become apparent as the description proceeds, cartridge 38 receives water to be filtered through inlet conduit 18 and thus provides the first filtration stage, which first stage is in serial-flow communication with a second stage filter 40, by manifold means to be described. After filtration in the second stage filtered water is discharged through outlet conduit 20.

The base 14 includes a lower base portion 42 and an upper base portion, or manifold chassis 44. By structure to be described in greater detail hereinafter, cartridges 38 and 40 are operatively retained in serial fluid communication with inlet conduits 18 and 20, and one another. The cartridges 38 and 40 are releasably retained by their respective locking rings 39 and 41. The locking rings 39 and 41 are journalled for limited oscillating rotation about a vertical axis relative to a plane parallel to the upper surface of manifold chassis 44. The locking rings may selectively be structured to be rotated either clockwise or counterclockwise to effect releasable retainment of the cartridge.

A significant aspect of the invention resides in a keyed connector means for operatively positioning the filter cartridges 38 and 40 in proper serial-flow relationship as illustrated in FIG. 3. As will be seen in FIG. 3 cartridges 38 and 40 are preferably provided with indicia as indicated generally at 38a and 40a, respectively, e.g. "start" and "lock" as well as symbols +"○" and "Δ" that enable a user to visually determine the proper placement of a given cartridge when replacement is required.

Figure 3A:
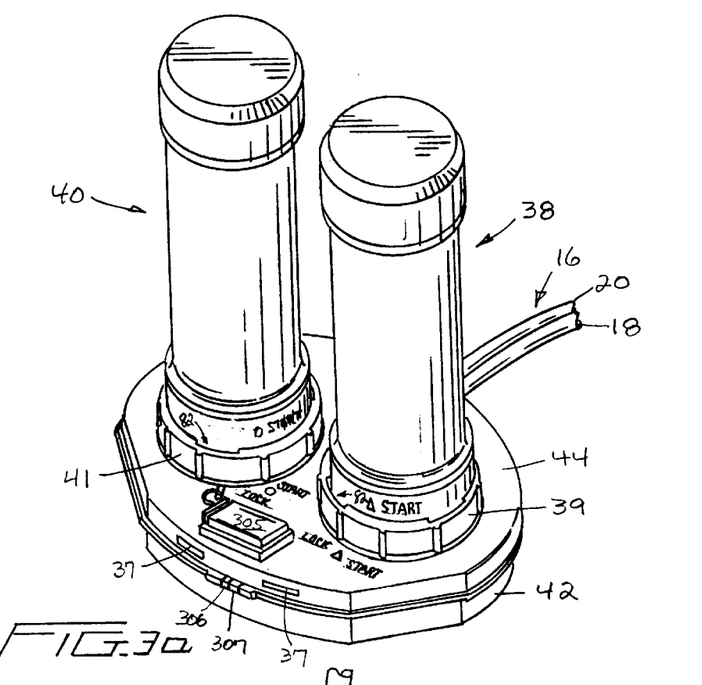
FIG. 3a is a perspective view similar to FIG. 3, showing an alternate position of elements of the keyed connector means.

Furthermore, as will be appreciated from a comparison of the position of rings 39 and 41 in FIGS. 3 and 3a, the rings 39 and 41 in FIG. 3 are in the "start" position, and in FIG. 3a are in the locked position by virtue of limited clockwise rotation.

Figure 4:
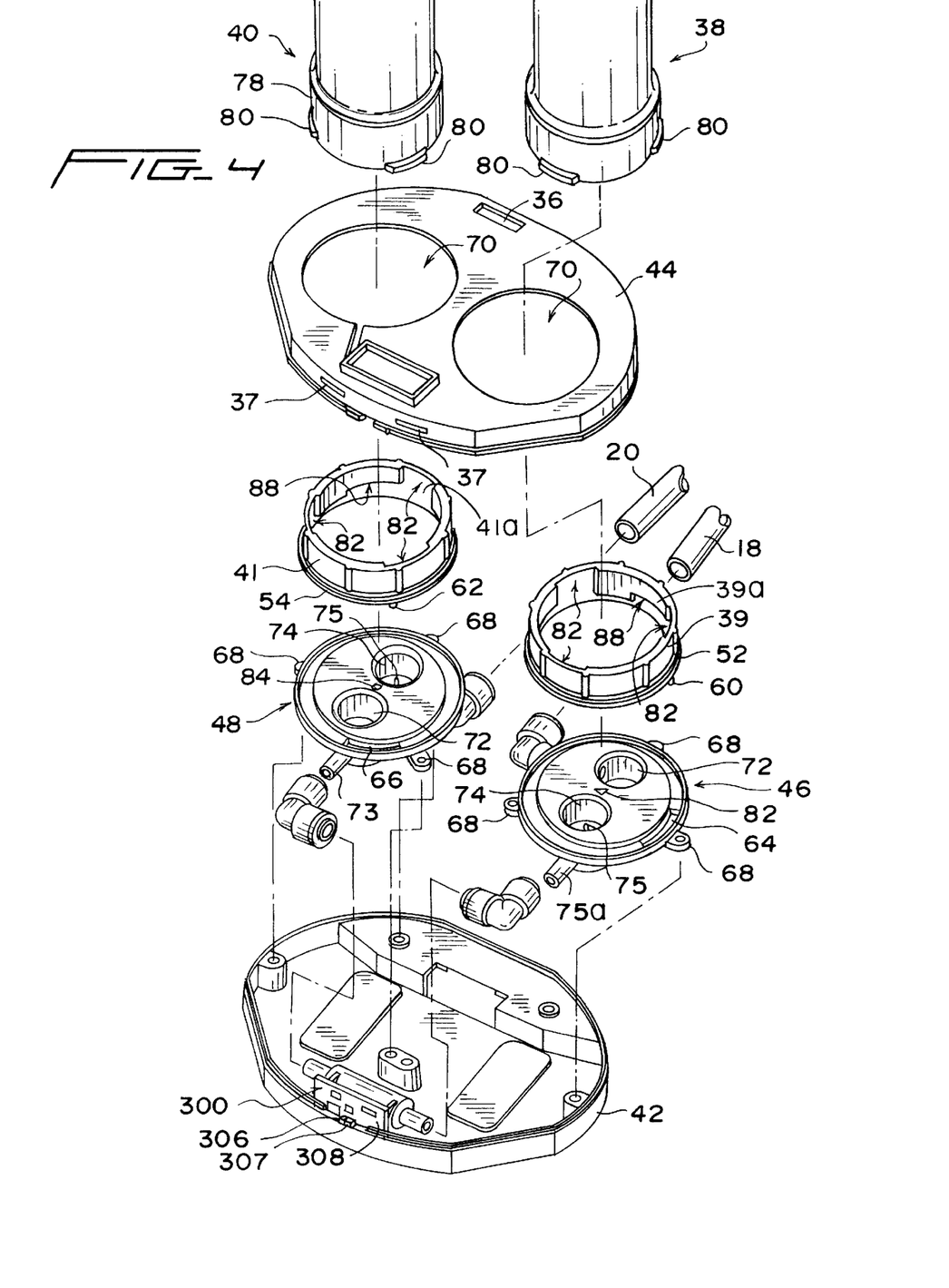
FIG. 4 is an exploded perspective view of the filter apparatus of FIG. 3, with portions of the filter cartridges broken away, to illustrate the several components of a serial-flow manifold means, a filter keyed connector means and a spent filter indicator.

In this latter regard, and with reference to FIG. 4, it will further be seen that in a preferred embodiment of the multi-stage water filter system 10 illustrated, first stage filter cartridge 38 and second stage filter cartridge 40, are received in first filtration stage and second filtration stage manifolds indicated generally at 46 and 48, respectively.

Figure 8A:
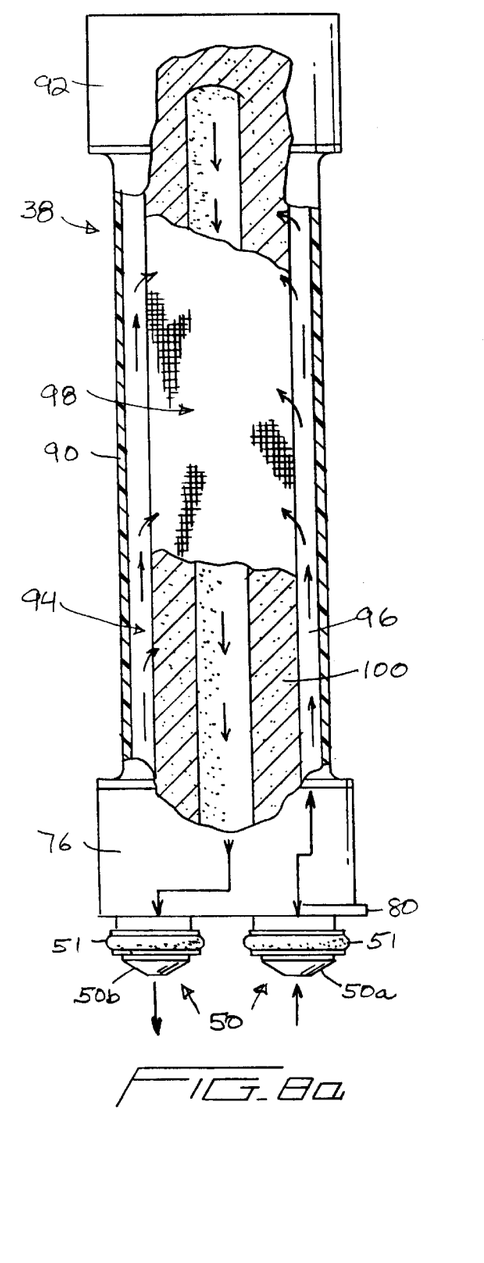
FIGS. 8a and 8b are enlarged front elevational views of first and second stage filter cartridges of the present invention with portions broken away to illustrate the construction of preferred first and second stage filter bodies.
Figure 8B:
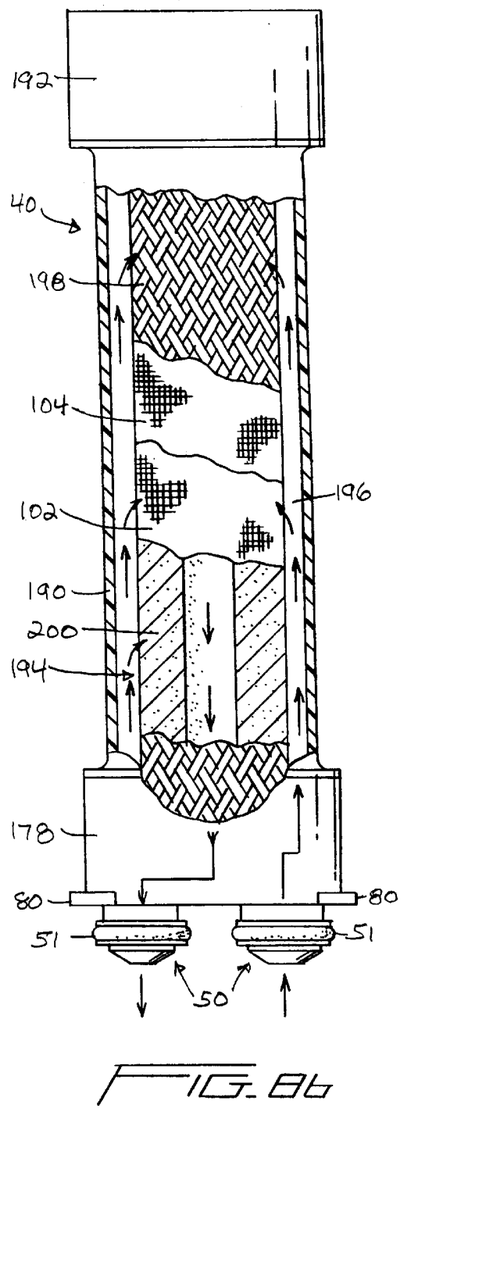

For the moment referring to FIG. 8 it will be seen that whether referring to filter cartridge 38 or 40 it will be understood that each is provided with relatively short inlet and outlet pipes, or spuds indicated generally at 50 provided with annular grooves 51 which grooves are each provided with an O-ring seal 51 formed of an elastomer, for example, Buna rubber.

A significant aspect of the invention resides in keyed connector, e.g., bayonet coupling, means for securing filter cartridges 38 and 40 in their proper serial-flow relationship given their preferred distinct filtering characteristics. For purposes of a detailed description of the keyed connector means it will be appreciated that the filter cartridge of FIG. 8a is a first filter stage cartridge and the filter cartridge of FIG. 8b is a second filter stage cartridge. It will be appreciated from simultaneous consideration of FIGS. 5, 6, 7 and 8 that spuds 50a are water inlet spuds and spuds 50b are water outlet spuds. A more detailed description of a preferred structure of first and second stage filter cartridges will be provided hereinafter.

Figure 5:
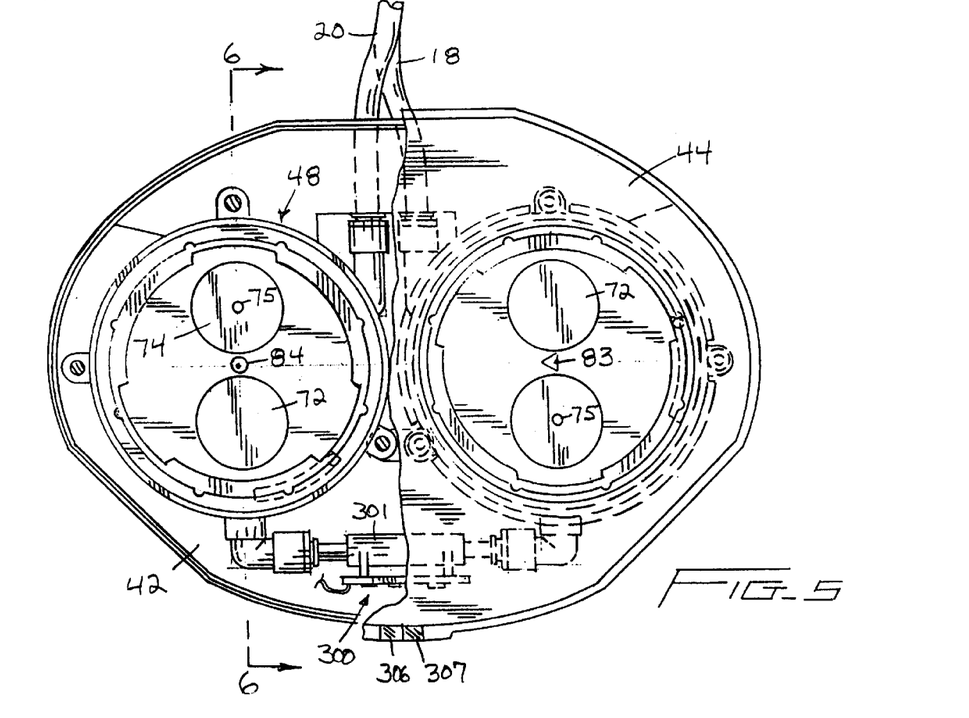
FIG. 5 is an enlarged top plan view, with a portion partially broken away, illustrating a portion of the keyed connector means which ensures replacement of the filter cartridges only in specific flow relationship to the serial-flow manifold means.

Turning now to further particulars of exemplary components of the multi-stage water filter system of the present invention as illustrated in FIGS. 4 and 5, it will be seen that the first and second filtration stage manifolds 46 and 48, respectively, receive locking rings 39 and 41, respectively, by virtue of their respective annular flanges 52 and 54 which are adapted to be rotatably received in complementary annular grooves 56 and 58 provided in the upper surface of the manifolds 46 and 48, respectively. As seen best in FIG. 4 the locking rings 39 and 41 are each provided with an integral downwardly projecting pin 60 or 62, which in assembled relationship of the rings 39 and 41 to their respective manifolds 46 and 48 project downwardly into arcuate grooves 64 and 66 provided in the upper surface of annular grooves 56 and 58. It will thus be appreciated that oscillatory rotation of the rings 39 and 41 is limited by their respective pin 60 or 62 as received in the respective arcuate grooves 64 and 66. The manifolds 46 and 48, with respective locking rings 39 and 41 operatively positioned thereon are secured to the underside of the manifold chassis 44 by suitable means, such as fasteners, projecting upwardly through apertured ears 68 integral with the body of the manifolds 46 and 48 thereby not only fixing the manifolds to the manifold chassis but also rotatably retaining the locking rings 39 and 41 between the manifolds and the underside of the manifold chassis 44 with the rings projecting upwardly through appropriately sized apertures as indicated at 70.

The manifolds 46 and 48 receive respective inlet and outlet spuds 50a and 50b, which are sealingly seated by virtue of their O-rings 51, in inlet and outlet wells 72 and 74, respectively. With more specific reference to the keyed connector means for the filter cartridges 38 and 40 are provided with lower end caps 76 and 78 each provided with one or more radially projecting lugs 80 circumferentially positioned and sized so as to be telescopically received in vertically extending grooves 82 circumferentially placed on the interior surface of the upstanding walls 39a and 41a of locking rings 39 and 41 respectively. The circumferential placement of the lugs 80 and grooves 82 differs for the first and second stage filters thereby enabling seating of a filter cartridge only in its respective first or second stage manifold.

Figure 6:
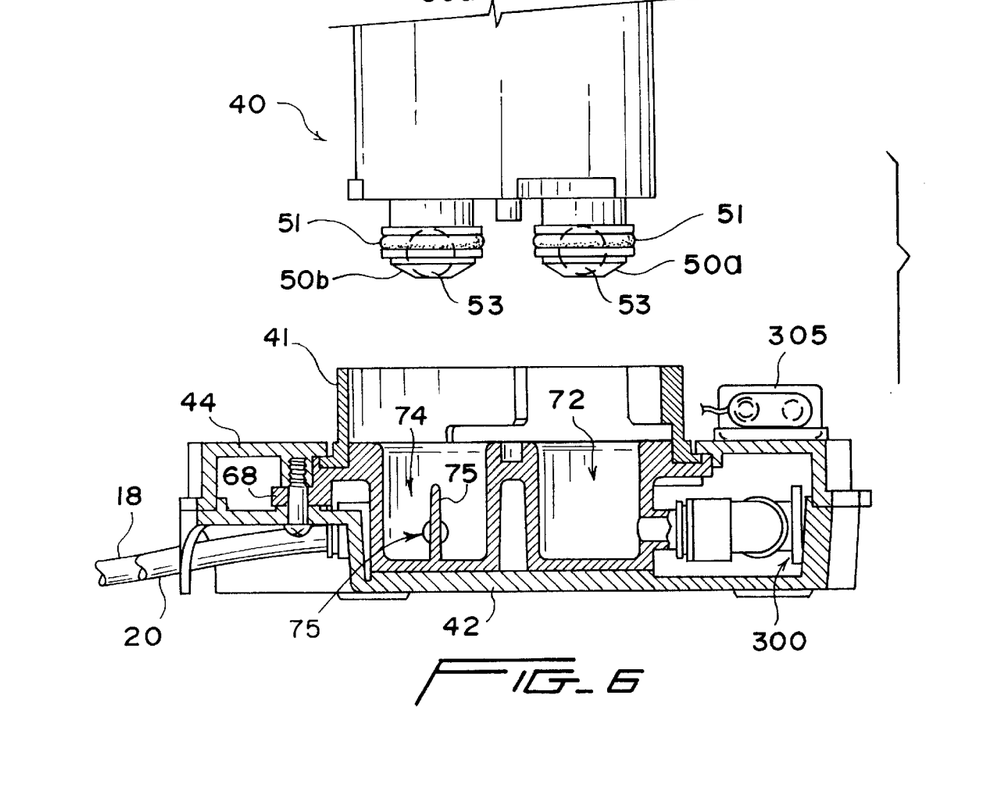
FIG. 6 is a vertical cross-sectional view taken along line 6—6 of FIG. 5.
Figure 7:
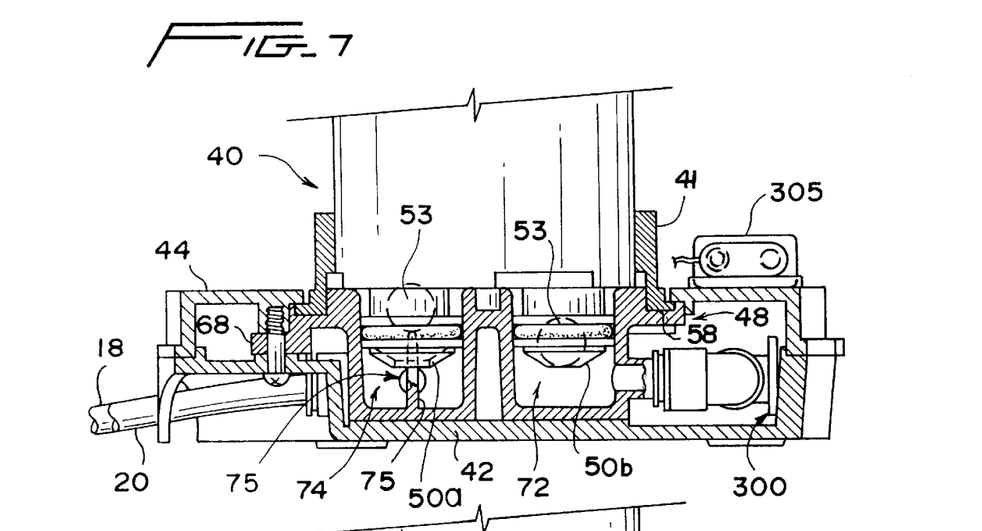
FIG. 7 is a vertical sectional view similar to FIG. 6 with the filter cartridge, partially broken away, shown operatively positioned in fluid flow relationship with its associated manifold and further illustrating operation of check valve means associated with a water inlet and outlet of the filter cartridge.

In this regard, from consideration of FIGS. 6 and 7 it will be seen that second stage filter cartridge 40 is shown in a position prior to such securement in FIG. 6 subsequent to such securement in FIG. 7. For purposes of the previously mentioned keyed connector means for only permitting securement of a filter cartridge in proper serial-flow relationship by virtue of its distinct filtering characteristics, the respective end caps 76 and 78 of filter cartridges 38 and 40 are provided with complementary elements that only permit them to be lockingly engaged in operative relation to their respective manifolds 46 and 48. The locking means thus includes, in a preferred embodiment, in addition to the above described distinct circumferential positioning of the radially projecting lugs on their respective locking rings 76 and 78, the provision, as best seen in FIG. 5, of recesses 83 and 84 in the upper surfaces of the first and second stage manifolds 46 and 48, respectively. In the exemplary embodiment of the invention illustrated in FIG. 5 it will be seen that the recess 83 is triangular in cross-section and the recess 84 is circular in cross-section. With reference to "sequential" FIGS. 6 and 7 it will be seen that second stage filter cartridge 40 is provided with an integral downwardly projecting key, or "peg" 86 which will be understood to be of a size and cross-section complementary to recess 84 which thus enables reception of "round peg" 86 in a "round hole" 84, which it will be appreciated would not be possible were an attempt made to seat the second stage filter 40 in the first stage manifold 46 since the circular cross-section key, or peg 86 could not be received in triangular recess or hole 82.

The aforedescribed elements of the keyed connector means for the filter cartridges of the present invention further includes, as best seen in FIG. 4, cam-follower surfaces 88 provided on the interior vertical wall of respective locking rings 39 and 41 by circumferentially extending extensions of the recesses 82. Referring once again to the circumferential placement of the radially projecting lugs 80 it will be appreciated that due to the fact that the locking rings 39 and 41 are journalled for limited rotation, as previously described, there is a further "keying" relationship between the distinct positioning of the lugs 80 on the respective locking rings 76 and 78 which dictates, and corresponds to, the circumferential placement of the grooves 82 in their respective locking rings. These additional keying features cooperate, of course, with the previously described peg-in-a-hole elements of the keying means. Furthermore, as will be best seen in FIG. 6, clockwise rotation of locking ring 41 results in downwardly inclined cam surface 88 acting upon its adjacent radially projecting lug 80 to thus sealingly clamp the respective cartridge to its respective first or second stage manifold in proper serial-flow relationship in the system, which relationship will be further described with respect to the structure of preferred embodiments of filter cartridges 38 and 40.

The clamping of the cartridges in this manner maintains the cartridges in "compression" relative to the manifold while permitting limited sealingly engaged movement of the spuds 50a and 50b in their respective wells 72 and 74. This enables expansion-contraction of components without compromising the connection of the cartridges to the manifold. The compression connection permits shipment of the filter system with the filter cartridges operatively positioned.

Additionally, filter cartridges 38 and 40, and their respective locking rings 39 and 41, may optionally be color coded, or keyed, to assist a user in installing a respective cartridge in its respective manifold.

As seen in FIGS. 4 and 5 the outlet well 74 of first filter stage manifold 46 is provided with an outlet conduit 75a which through appropriate conventional fittings, or conduit, is connected to an inlet conduit in communication with inlet well 72 of the second stage manifold 48 thus placing the filters in serial-flow relationship. Interposed in the conduit leading from manifold 46 to manifold 48 is a means indicated generally at 300 comprising a spent filter cartridge indicator.

Turning to FIG. 8a it will be seen that the first stage filter cartridge indicated generally at 38 includes a cylindrical filter body 90 provided with an upper end cap 92 and lower end cap 76. In the exemplary embodiment of first stage filter cartridge 38 illustrated it will be seen that the assembly comprising the body 90 and upper and lower end caps 92 and 78, provide a housing for filter media indicated generally at 94. It will be appreciated from the following description that the flow of water being filtered is schematically indicated by arrows showing that the flow of water being filtered enters through spud 50a which is in free fluid flow communication with an annulus 96 which exists between the interior wall of the body 90 and filter media 94. Water being filtered then passes centripetally, through a membrane wrap 98, which membrane 98 is wrapped around a microporous activated carbon body 100. The microporous carbon body 100 preferably is formed of resin bonded activated carbon granules. This first stage filter cartridge effects removal of sediment, heavy metal such as lead, nitrate and nitrite ions, radio-active substances, some VOC's, and reduces chlorine as well as improving odor, taste and color, i.e. turbidity.

Turning to FIG. 8b it will be seen that the second stage filter cartridge indicated generally at 40 includes a cylindrical filter body 190 provided with an upper end cap 192 and lower end cap 178. In the exemplary embodiment of second stage filter cartridge 40 illustrated it will be seen that the assembly comprising the body 190 and upper and lower end caps 192 and 178, provides a housing for filter media indicated generally at 194. It will be appreciated from the following description, that essentially as schematically indicated by arrows with regard to the flow of water being filtered through the first filter stage 38, flow through the second filter stage 40 enters through spud 50a which is in free fluid flow communication with an annulus 196 which exists between the interior wall of the body 190 and filter media 194. Water being filtered then passes, centripetally successively through coarse non-filtering netting 198 which is provided to ensure the integrity of underlying filtration layers. The water then passes inwardly through an outer prefiltration wrap 104, and then through at least one membrane, and preferably two membranes 102 secured as a wrap around a porous carbon body 200. In such preferred embodiment the membrane 102 of the second stage filter 40 preferably has a pore size in the order of about 0.4 μm. In the preferred embodiment the extruded microporous carbon body 200 is preferably formed of activated carbon granules and is impregnated with a bacteriostatic agent such as a salt of silver, the oxide of which provides bacteriostatic properties to the second stage filter cartridge 40.

It will be appreciated that the second stage filter 40 provides a "polishing" filter which enables the multi-stage water filter system of the present invention to further reduce VOC's, eliminate microorganisms such as cysts, *E coli,* eliminate chlorine and effect further improvement in taste as well as odor reduction such that water exiting the second filter stage of the filter system through conduit 20 is such as complies with applicable NSF standards for performance with regard to removal of lead, nitrate and nitrite ions, radioactive substances, VOC's and microorganisms.

With reference to FIGS. 6 and 7 it will be seen, with regard to second filter stage cartridge 40, the spuds 50*a* and 50*b* are provided with spherical ball checks 53 which ensure that when a water filled spent filter cartridge is uncoupled from its manifold little, if any, water is released due to seating of the ball checks in their position as seen in FIG. 6. In use the ball check 53 seated in inlet spud 50*b* will be unseated by the flow of water while the ball check 53 in outlet spud 50*a* will normally be forced into sealing relation. Thus, each of the outlet wells 74 of the manifolds 46 and 48 is provided with an upwardly projecting pin 75 which maintains the ball check 53 in the outlet spud 50*a* in unseated position when the filter cartridge is seated in its manifold 46 or 48.

Figures 10, 11:
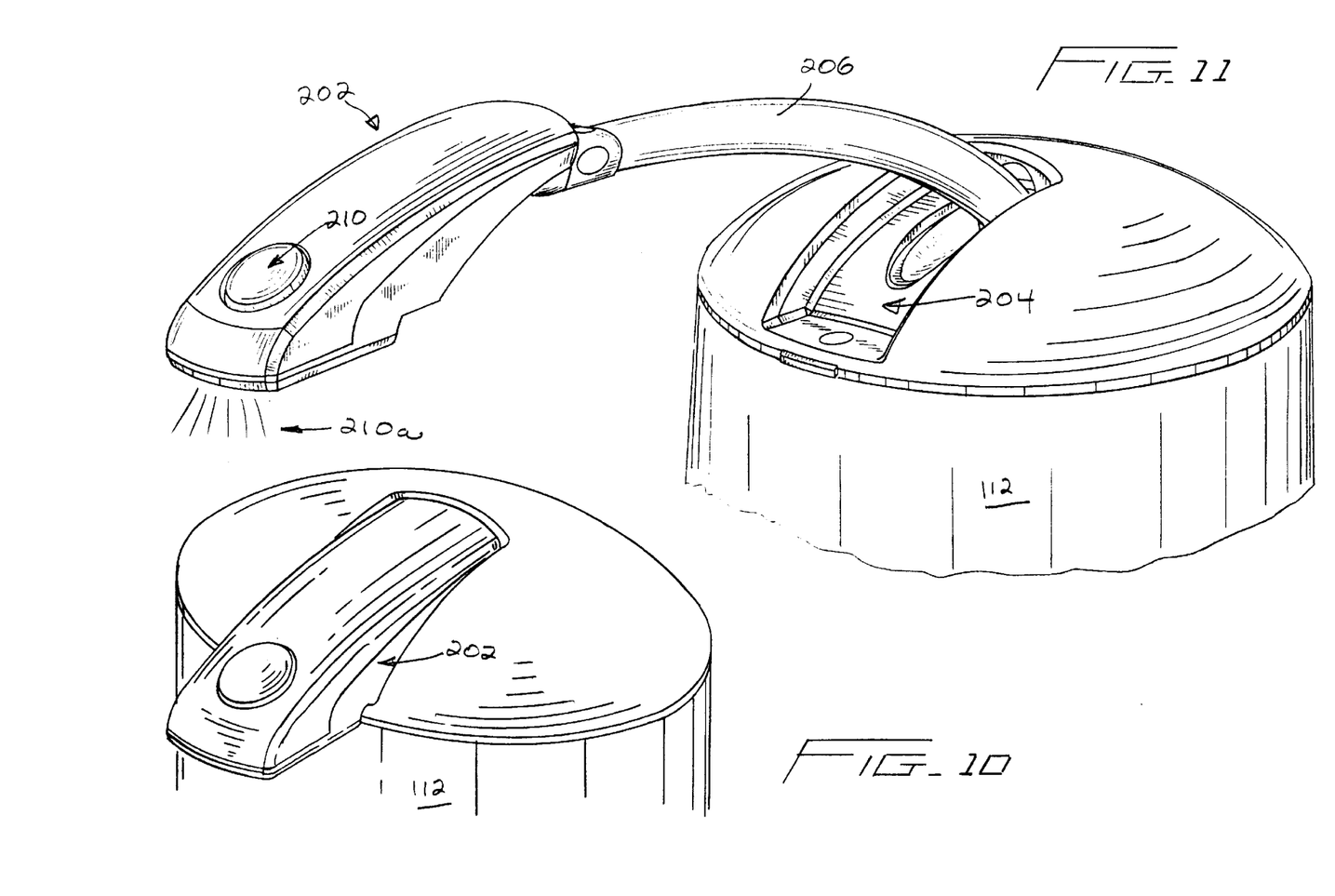
FIGS. 10 and 11 are enlarged fragmentary perspective views of an alternate embodiment of the water filter system of the present invention as provided with a hand-held sprayer illustrated as being nested in FIG. 10 and extended as in normal use in FIG. 11.
Figure 12:
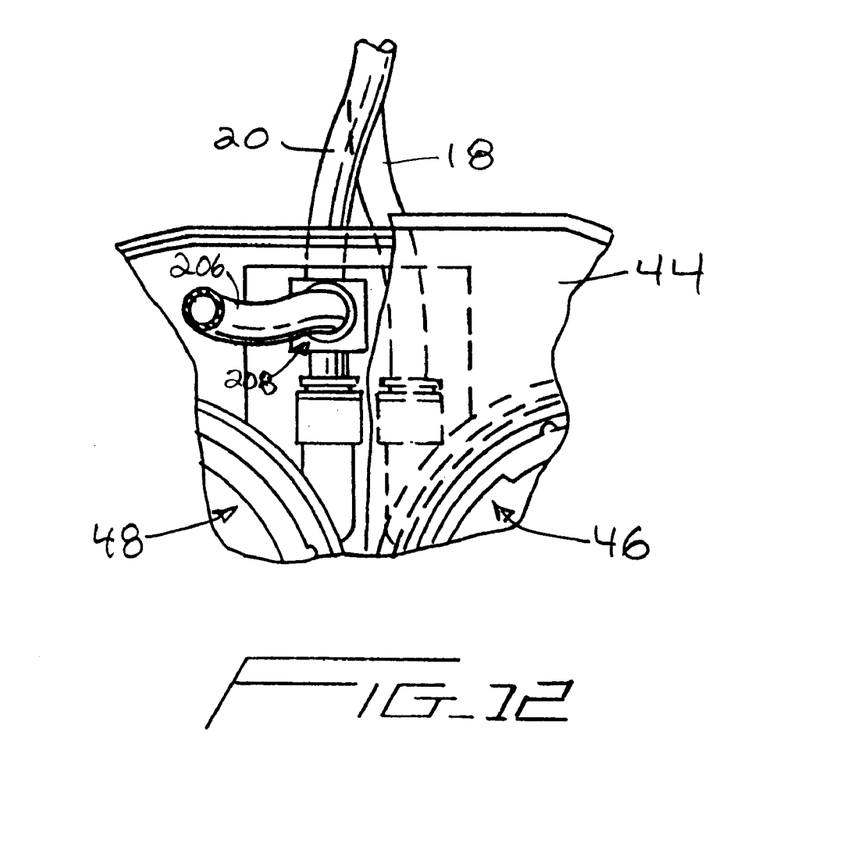
FIG. 12 is a fragmentary view similar to a portion of FIG. 5 with and illustrating a valve means for diverting filtered water to the spray head illustrated in FIGS. 10 and 11.

Turning now to the alternate embodiment of FIGS. 10, 11 and 12 it will be seen that the decorative housing 112 is modified to accept a hand-held spray head indicated generally at 202, which is shown as being received in a complementary recess indicated generally at 204 in the top housing 112. As will further be seen from FIG. 11 the spray head 202 is connected by flexible conduit 206 to receive filtered water being discharged from the second stage filter 40. as will be appreciated from FIG. 12, although not shown, that flexible conduit 206 is connected to outlet conduit 20 by a "shuttle" valve indicated generally at 208. The shuttle valve is of conventional construction such as normally utilized in a hand-held sprayer assembly provided in conjunction with a kitchen faucet, which shuttle valve in response to a pressure differential diverts water from the kitchen faucet to its associated spray head. In a similar manner a normally closed thumb operated valve indicated generally at 210, when depressed, opens a diverter valve, not shown, thus effecting a pressure drop in conduit 206 which causes shuttle valve 208 to divert filtered water from conduit 20 leading to the diverter valve 22 to conduit 206 of spray head 202, causing a spray 210*a* of filtered water to discharge from the spray head 202 as long as the valve 210 is depressed.

Figure 9:
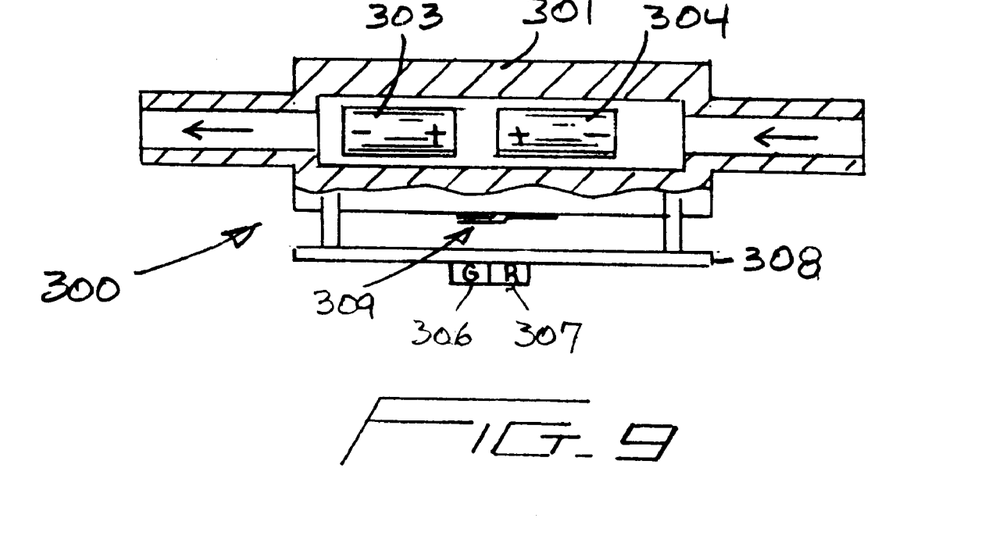
FIG. 9 is an enlarged schematic illustration of a portion of a spent filter indicator as seen in both FIGS. 4 and 5.

The spent filter indicator shown generally at 300 is operatively positioned in FIGS. 4 and 5 and is interposed in fluid through flow communication between outlet 75 of manifold 46 and inlet 73 of manifold 48. However, it will be appreciated that it may operatively be positioned wherever it is subjected to the full flow of water into, or out of, the water filter system. In enlarged schematic FIG. 9 the general organization of the spent filter indicator 300 is illustrated. It will be seen that the indicator housing 301 includes an enlarged bore 302 which houses a pair of magnets 303 and 304 which are arranged so as to have their like polarities, e.g. their positive polarities as indicated, adjacent one another. It will thus be appreciated that in the absence of through flow of water, the two magnets are spaced apart by virtue of being repulsed by the adjacent like polarities. However, the size and mass of the magnets is selected so that under the influence of at least a minimum threshold flow of water in the direction of the arrows displaces magnet 304 toward magnet 303 despite the like polarity. External to the bore 302 is an electrical normally open reed switch 309. In a conventional manner when magnet 304 is urged by water flow toward adjacent magnet 303 the magnetic field effect is increased, which increase is sufficient to cause electrically conductive paramagnet elements of reed switch 309 to close and thus complete an electrical circuit. This provides an electrical signal to a printed circuit board 308, electrical power to which is supplied by the battery 305 as seen in FIG. 3. The printed circuit board 308 essentially comprises a conventional computer chip which may selectively be programmed to carry out various indicator functions. For purposes of the present invention, at a minimum, the chip of printed circuit board 308 is programmed to energize a green light emitting LED 306 as long as water is flowing through the filter. When the cartridges 38 and 40 are installed in their respective manifolds a fresh battery 305 is installed, which installation by virtue of programming of the chip in circuit board 304 initializes a "calendar" function. At the termination of a preselected period, i.e., four months, from initialization of the calendar function, LED 306 is turned off and red light emitting LED 307 is energized so as to indicate that the filters are "spent" i.e., require replacement, which replacement is accompanied by replacement of the battery 305 which re-initializes the described calendar function. It will be appreciated that a myriad of other functions may be programmed into the computer chip and thus be indicated by the LEDs.

It will be appreciated that numerous changes within the skill of one in the art may be accomplished without departing from the invention described and claimed herein.

What is claimed is:

1. A multi-stage water filter system comprising:

at least a first stage water filter cartridge and a second stage water filter cartridge each, having distinct filtering characteristics;

manifold means for connecting said at least first and second stage water filter cartridges for serial flow of water therethrough;

keyed coupling means for connecting said at least first and second stage filter cartridges to said manifold means only in a preselected position for serial flow of water therethrough;

said cartridges each including an elongated filter housing having a closed upper end and a lower end provided with a longitudinally extending water inlet conduit and a longitudinally extending water outlet conduit, said longitudinally extending inlet and outlet conduits being telescopically received in said manifold means for serial flow of water therethrough;

said lower end of each of said filter housings being provided with at least one radially protecting lug, said at least one lug of said first and said second cartridges being of different circumferential position on said housing relative to said water inlet and water outlet conduits;

said keyed coupling means for said at least first and second stage filter cartridges including at least a pair of locking rings rotatably lournalled to said manifold means for limited rotary oscillation, said locking rings each having an upstanding wall, said upstanding wall of said locking rings being provided with at least one vertically extending groove for reception of said at least one lug of said lower end of each of said cartridges wherein said first and second stage water filter cartridges can only be operatively positioned in said preselected flow relation.

2. The multi-stage water filter system of claim 1 wherein said filter cartridges having distinct filtering characteristics include indicia for assisting in connection of said cartridges to said manifold means in proper relation to said manifold means.

3. The multi-stage water filter system of claim 1 further including means for at least indicating water flow therethrough.

4. The multi-stage water filter system of claim 1 further including spent filter cartridge indicator means.

5. The multi-stage water filter system of claim 1 wherein said first stage filter cartridge only passes particles of less than about 1 $\mu$m.

6. The multi-stage water filter system of claim 1 wherein said second stage filter cartridge only passes particles of less than about 0.4 $\mu$m.

7. The multi-stage water filter system of claim 1 wherein at least one of said first and second stage filter cartridges include a filter media which comprises a microporous activated carbon body provided with at least a membrane wrap.

8. The multi-stage water filter system of claim 1 second cartridge includes a filter media which comprises a bacteriostat.

9. The multi-stage water filter system of claim 1 wherein said lower end of each of said filter housings is provided with three circumferentially spaced radially projecting lugs and said locking rings are provided with three vertically extending grooves for reception of said three lugs.

10. The multi-stage water filter system of claim 1 wherein said at least a pair of locking rings are each provided with a pin for effecting said limited rotary oscillation of said locking rings.

11. The multi-stage water filter system of claim 1 wherein said longitudinally extending inlet and outlet conduits are provided with O-ring seals for sealingly seating said cartridges in said manifold means.

12. The multi-stage water filter system of claim 1 wherein said keyed coupling means further includes protuberances and recesses of complementary cross-section for further assisting in insuring that first and second stage water filter cartridges can only be operatively positioned in said preselective flow relation.

13. The multi-stage water filter system of claim 1 wherein said at least a pair of locking rings rotatably journalled to said manifold means includes means for retaining said cartridges in compression relative to said manifold means while enabling expansion-contraction of said cartridges relative to said manifold means without compromising connection of said inlet and outlet conduits in said manifold means.

* * * * *